United States Patent Office 3,231,472
Patented Jan. 25, 1966

3,231,472
METHOD OF INCREASING WATER-ABSORBING ABILITY OF HUMAN SKIN AND COMPOSITION THEREFOR
Otto Karl Jacobi, Wiesbaden-Igstadt, and Bernhard-Jürgen Engelmann, Wiesbaden, Germany, assignors to Kolmar Laboratories, Inc., Milwaukee, Wis., a corporation of Delaware
No Drawing. Filed Mar. 10, 1961, Ser. No. 94,708
6 Claims. (Cl. 167—90)

This invention relates to a synthetic moisturizing composition and to a method of prepaing the same.

The epidermis or outer layer of skin is composed of two main layers, the stratum granulosum and the stratum corneum, which is located superificial to the stratum granulosum and is separated therefrom by a transparent layer of cells called the stratum lucidum. The innermost layer of the epidermis is a single row of cells which continually divide to replace the corneum layer as the same is worn away. The cells gradually die as they move outwardly to the corneum, and the corneum, itself, is essentially dead skin consisting mostly of keratin, which is a protein material.

The corneum layer protects the granulosum layer and prevents the granulosum layer from drying out. Under normal skin conditions, the corneum layer contains about 10% to 30% water which gives the skin its elasticity. The lucidum layer, which separates the corneum and the granulosum layer permits the passage of water vapor between the two layers but prevents the outward passage of liquid water from the granulosum layer and thereby prevents the granulosum layer from losing its water content. The corneum, however, allows the evaporation of water passing outwardly from the granulosum layer through the lucidum layer.

By the procedure of keratinization by which the skin cells are constantly reproduced, a fat-like material is produced in the granulosum layer which is disposed between the layers of keratin in the corneum and serves as an insulator and a lubricant. The fat material developed in the granulosum layer differs from the fat produced by the sebaceous glands which are located on the hair roots in the dermis layer of the skin. The sebaceous glands secret fat into the hair ducts and this fat material passes through the hair openings and lubricates the hair on the skin surface. In addition to the sebaceous fat, depot fat is also present in the inner layers of skin.

When the corneum layer of the skin loses its natural water content the skin becomes dry and scaly in appearance. It has been the theory in the past that the skin becomes dried out due to the loss of the fate materials in the corneum and therefore many cosmetic and pharmaceutical products in the past have attempted to eliminate the dry skin problems by superfatting the cosmetic products. In this regard, materials, such as lanolin and other fat base substances, have been added to the cosmetics in an attempt to introduce fat materials to the corneum layer of the skin.

More recently, it has been shown that dry skin is not caused by the loss of the fat material in the corneum layer but rather by the loss of the water soluble constituents in the corneum layer. It has been found that the keratin which forms the essential constituent of the corneum layer of the skin, when separated from the water soluble materials normally present therein, will absorb water vapor but will not absorb liquid water. While the keratin is hygroscopic and will absorb water vapor, the water vapor will not be held for any length of time and will be given up very quickly to the surrounding atmosphere. Therefore, the corneum layer of human skin which has lost the water soluble material will be relatively hydrophobic and will not retain water vapor. Thus, the corneum layer will tend to dry out quickly and the skin will lose its moist appearance and become dry and scaly.

To normalize dry skin conditions and enable the skin to absorb water, the skin can be treated with the water soluble extractions of a keratin structure such as the stratum corneum or a horn material. This natural moisturizing material is produced by contacting the finely divided keratin material, such as horn, hair, stratum corneum of the epidermis, feathers or hooves, with water at a temperature below 60° C. to remove or dissolve the water soluble moisturizing constituents from the keratin material. The removal and use of the natural water soluble constituents from keratin in cosmetic and pharmaceutical products is described in the copending applications Serial No. 691,538, filed October 22, 1957, now abandoned, and Serial No. 686,593, filed September 27, 1957, now abandoned. In the process of extracting the water soluble moisturizing material from the natural keratin, the yield is very small, in the neighborhood of 0.1%, which means that very large amounts of keratin must be used and handled to obtain any substantial amount of the moisturizing material. This, of course, increases the cost of the process.

In addition, the natural water soluble extracts of the keratin material contain constituents which have a somewhat objectionable odor. In some cases these constituents cannot be entirely eliminated and this discourages the use of the natural extracts in some cosmetic products. Similarly, the natural extraction has a dark color which cannot be entirely removed and this again tends to discourage the use of the natural extract in other cosmetic products.

Because of these problems in connection with the use of the natural moisturizing material extracted from a keratin structure, there has been considerable activity in an attempt to synthesize a moisturizing material having water absorbing properties similar to those of the natural extract. The water soluble extract of the stratum corneum of the human skin, which is the natural moisturizing material, by analysis has been found to consist of the following ingredients: free amino acids, such as glycine, threonine, alanine, tyrosine, valine, leucine, arginine, aspartic acid, glutamic acid and serine; other constituents, such as pyrrolidoncarbonic acid, urea, ammonia, uric acid, glucosamine, creatinine, lactates, citrates, formiates, chlorides, phosphates, and salts of sodium, potassium, calcium, and magnesium. In addition, some authors have identified pentose and other reducing sugars. About 10% of the water soluble constituents of keratin are unidentified.

Tests have been made to determine the water absorption characteristics of the various constituents present in the natural moisturizing material and these materials, tested either alone or in combination, did not produce any increase in the water vapor absorption characteristics.

The present invention is directed to a synthetically derived composition having water absorption qualities comparable to those of the natural keratin extract but having the additional advantages of being odorless, colorless and completely soluble in water so that clear solutions can be produced. The synthetic moisturizing material is the condensation product of amino acids with reducing sugars and this condensation product can be used either alone in cosmetic or pharmaceutical products or preferably can be combined with aspartic acid and urea as well as other compounds found in the natural extract to provide a very effective moisturizing composition.

The amino acids to be used in preparing the condensation product may be aliphatic, aromatic or cyclic amino acids. In general the number of carbon atoms in the amino acid in unlimited; however, it is preferred to employ amino acids having a carbon content in the range of 2 to 50. In addition, the amino acid may contain other substituent groups, such as OH, SH, SS, NH, CO, halogen, phenyl, and the like, and these substituent groups may be located at any position in the molecule, as long as they are not attached to the amino group, without affecting the characteristics of the condensation product. Specific examples of amino acids which can be employed in preparing the condensation product are serine, glycine, alanine, threonine, tyrosine, valine, leucine, phenylalanine, histidine, arginine, aspartic acid, glutamic acid, isoleucine, proline, hydroxyproline, cysteine, cystine, methionine, lysine, tryptophan, thyroxin, and the like.

The reducing sugars to be used in preparing the condensation product are monosaccharides, disaccharides or polysaccharides containing a ketone or aldehyde group. A reducing sugar is defined as one which will reduce Fehling's solution. Examples of sugars which can be employed in preparing the condensation product are glucose, maltose, lactose, glycerinaldehyde, dioxyacetone, 2-desoxy-D-xylose, b-2-desoxy-D-ribose, ribose, xylose, rhamnose, mannose, galactose, xylobiose, cellubiose, fructose, arabinose, talose, allose, altrose, idose, lyxose, and the like. In addition, the reducing sugars may contain amino substituent groups such as glucose amine, or carboxyl groups such as glucuronic acid.

The amino acids and reducing sugars react easily with each other by condensation. By this condensation the amino group of the amino acid reacts with the ketone or aldehyde group of the reducing sugar to form a N-glycoside. The N-glycosides are not stable and transform spontaneously, especially in the presence of proton donors, into so-called Amadori or Heyne compounds.

In preparing the condensation product, the amino acids or their water soluble salts are brought into contact with the reducing sugars to provide the N-glycosides. It is preferred to employ a solvent, such as methanol, although the amino acids and sugars can be brought together in any manner under which the N-glycosides will be built. While the reaction will occur at room temperatures, the reactants may be heated to accelerate the condensation and the temperature is generally determined by the solvent employed, with the temperature below the boiling point of the solvent.

It is preferred to initially build the alkali metal salts of the amino acid, such as the sodium, potassium or lithium salts. The amino acid salts give better yield than the free acid and the reaction conditions are also improved since the reaction time is shorter and a pure product without by-products is produced. The amino acid salts are preferably prepared by reacting the amino acid with an alkali metal methylate, such as sodium methylate. In preparing the alkali metal amino acid it is necessary to maintain the methylate and the amino acid in substantially a mol to mol ratio, for if there is an excess of either reactant, the resulting product will be a dark, resinous mass rather than a light-colored product of good yield if the proper mol to mol ratio is employed. If the amino acid contains more than one carboxyl group, a one mole to one mol ratio of methylate to carboxylic group can be used in which case a mono salt will be built and the acid will contain additional free carboxyl groups. Alternately, however, additional mols of the methylate may be employed to correspond to the number of mols of carboxyl groups so that a polycarboxyl salt is formed and all of the carboxyl groups are transformed into the salts.

After the first step, a proton donor is added to transform the N-glycosides into a condensation product of the Amadori or Heyne type. The proton donor can be either an added acid, or in the case of dicarboxyl amino acids or polycarboxyl amino acids, the hydrogen atom of the free carboxyl group can be used as the proton donor. If the amino acid employed in the condensation reaction has more than one carboxylic group which is not blocked, the free carboxylic group can serve as the proton donor and additional proton donors in the form of acids need not be added.

The synthetic moisturizing material to be incorporated into a cosmetic or phamaceutical product may contain the condensation product alone, but preferably the condensation product is combined with aspartic acid and urea to provide a synthetic moisturizing composition having the following formulation:

|  | Percent |
| --- | --- |
| Aspartic acid | 0.1–90.0 |
| Urea | 0.1–90.0 |
| Condensation product | Balance |

The aspartic acid need not be a constituent of the condensation product but should be present in the moisturizing composition in a free form. Furthermore, it may also be desirable to employ the above synthetic moisturizing composition with other naturally occurring materials from a keratin structure, with the synthetic composition being employed in an amount of 0.5 to 99.0% by weight of the total mixture. The naturally occurring materials which can be incorporated with the synthetic mixture are amino acids such as glycine, threonine, alanine, tyrosine, valine, leucine, phenylalanine, proline, citrulline, ornithine, histidine, lysine, arginine, glutamic acid, and serine; pyrrolidoncarbonic acid; ammonia; uric acid; glucosamine; creatinine; salts of sodium, calcium, potassium, magnesium; phosphates; chlorides; lactates; citrates and formiates.

It is also important that the total synthetic moisturizing composition which includes the condensation product and other ingredients has a pH within the range of 3 to 9 and preferably within the range of 4.5 to 5.5.

The synthetic moisturizing composition, or the condensation product if used alone, is employed in an amount of 0.5% to 95% by weight of a cosmetic or phamaceutical base. If the composition is to be employed in a tonic, such as an after-shave lotion, the composition is generally dissolved in water and mixed with about 70% to 80% by weight of alcohol and perfume to form the lotion.

With a lipstick or wax base material, the moisturizing composition is usually dispersed in a glycol, glycerine or monoglyceride and the resulting solution is then mixed with the waxes and other ingredients of the lipstick. With a cream or ointment which contains water, the composition, or the condensation product if used alone, is initially dissolved in water and the solution is then employed in the cream base. If the cream does not contain water, the composition is initially dissolved in a material, such as a glyceride or lanolin, and then added to the cream base.

PREPARATION OF THE CONDENSATION PRODUCT

Example No. 1

Eight and one-half grams of mono-sodium L-glutamate and 9.0 grams of D-glucose were dissolved in 20 cc. of water at 35° C. The solution was heated at 100° C. for one hour and subsequently dried by freeze drying. The dried product was an amorphous, powdery material.

The product was extracted with methanol. The condensation product was precipitated with ether. The condensation product was purified by dissolving it in methanol and re-precipitating it with ether. The resulting material was a white hygroscopic powder.

Example No. 2

One and one-half gramos of mono sodium L-aspartic acid hydrate and 1.5 grams of D-ribose were dissolved in 5 cc. of water and refluxed for one hour. The unreacted aspartic acid was filtered off and the filtrate was freeze dried. The dry material was extracted with methanol and the methanol solution was precipitated with ether to provide the transformed condensation product.

The condensation product was decolorized with active carbon powder in methanol and re-prepicitated with ether. The resulting material was a light yellow powder.

Example No. 3

The condensation product in this example was prepared from mixed amino acids and reducing sugars.

120 mg. of aspartic acid, 30 mg. of glutamic acid, 160 mg. of glycine, 120 mg. of threonine, 160 mg. of alanine, 80 mg. of tyrosine, 60 mg. of valine, 80 mg. of leucine, 100 mg. of histidine-hydrochloride, 110 mg. of lysine-hydrochloride, 100 mg. of arginine-hydrochloride and 250 mg. of serine were dissolved as sodium salts in 100 cc. of methanol and this mixture was added to 300 mg. of glucose, 30 mg. of fructose and 12 mg. of ribose dissolved in one liter of methanol. This mixture was refluxed for one hour.

765 mg. of oxalic acid dissolved in 20 cc. of methanol was then added to the refluxed mixture and further refluxed for ½ hour. The built sodium oxalate was filtered off. In the filtrate the methanol was evaporated under vacuum and the residue was dissolved in 200 cc. of water. The excess oxalic acid was precipitated with 4.5 mg. of CaO and filtered off. The water was then evaporated under vacuum to provide a yellowish viscous material condensation product.

PREPARATION OF THE SYNTHETIC MOISTURIZING COMPOSITION

Example No. 4

Ten grams of the condensation product prepared in Example No. 1 were mixed with the following materials to provide a synthetic moisturizing composition: 9 grams glycine, 1 gram threonine, 10 grams alanine, 1.5 grams tyrosine, 2 grams valine, 2 grams leucine, 4 grams phenylalanine, 1 gram proline, 1 gram citrulline, 2 grams ornithine, 1.5 grams histidine, 1.5 grams lysine, 1.5 grams arginine, 6 grams aspartic acid, 1.5 grams glutamic acid, 2.5 grams serine, 10 grams pyrrolidoncarbonic acid, 0.1 gram uric acid, 10 grams urea, 13.3 grams sodium lactate, 3.4 grams sodium chloride, 3.6 grams calcium chloride, 6.2 grams potassium chloride, 0.1 gram glucosamine, 0.1 gram ribose, 1 gram $MgHPO_4 \cdot 3H_2O$ and 1 gram sodium citrate.

INCORPORATION OF THE MOISTURIZING COMPOSITION IN COSMETIC AND PHARMACEUTICAL PRODUCTS

Example No. 5

The condensation product of Example No. 1 was employed in a cosmetic cream having the following composition by weight:

| | Percent |
|---|---|
| Beeswax | 13 |
| Spermaceti | 2 |
| Petrolatum | 10 |
| Peanut oil | 20 |
| Sesame oil | 20 |
| Borax | 1 |
| Condensation product (10% water solution) | 34 |

Example No. 6

The synthetic moisturizing composition of Example No. 4 was mixed with sulfonated castor oil to form a bath oil having the following composition by weight:

| | Percent |
|---|---|
| Sulfonated castor oil | 65.0 |
| Moisturizing composition | 20.0 |
| Perfume | 15.0 |

Example No. 7

One gram of the condensation product of Example No. 2 was mixed with 0.5 gram of urea and 0.5 gram of aspartic acid to form a moisturizing composition, and this moisturizing composition was incorporated in a sun tan lotion having the following composition by weight:

| | Percent |
|---|---|
| Beeswax | 18.0 |
| Liquid paraffin | 40.0 |
| Sunscreen | 10.0 |
| Water | 29.0 |
| Moisturizing composition | 2.0 |
| Borax | 1.0 |

Various modes of carrying out the invention are contemplated as being within the scope of the following claims particularly pointing out and distinctly claiming the subject matter which is regarded as the invention.

We claim:

1. A synthetic moisturizing material to be incorporated with a topical base, consisting essentially of 0.1% to 90.0% of aspartic acid, and the balance a stable product selected from the group consisting of an Amadori rearrangement product and a Heyne rearrangement product, said product being produced by condensing an amino acid with a reducing sugar to provide a N-glycoside and thereafter contacting said N-glycoside with a proton donor to provide the stable product.

2. A synthetic moisturizing material to be incorporated with a topical base, consisting essentially of 0.1% to 90.0% of aspartic acid, and the balance a stable product selected from the group consisting of an Amadori rearrangement product and a Heyne rearrangement product, said product being produced by condensing an amino acid selected from the group consisting of serine, glycine, alanine, threonine, tyrosine, valine, leucine, phenylalanine, histidine, arginine, aspartic acid, glutamic acid, isoleucine, proline, hydroxyproline, cysteine, cystine, methionine, lysine, tryptophan, thyroxin and mixtures thereof with a reducing sugar selected from the group consisting of glucose, maltose, lactose, glycerinaldehyde, dioxyacetone, 2-desoxy-D-zylose, b-2-desoxy-D-ribose, xylose, rhamnose, mannose, galactose, zylobiose, cellubiose, fructose, arabinose, talose, allose, altrose, idose, lyxose, glucose amine, glucuronic acid and mixtures thereof to provide a N-glycoside and thereafter contacting said N-glycoside with a proton donor to provide the stable product.

3. The synthetic moisturizing material of claim 2 and including from 0.1% to 90.0% by weight of urea.

4. A method of increasing the water-absorbing ability of human skin, comprising the step of applying to the skin a topical base having incorporated therein from 0.5% to 95% by weight of a stable product selected from the group consisting of an Amadori rearrangement product and a Heyne rearrangement product, said product being produced by condensing an amino acid selected from the group consisting of serine, glycine, alanine, threonine, tyrosine, valine, leucine, phenylalanine, histidine, arginine, aspartic acid, glutamic acid, isoleucine, proline, hydroxyproline, cysteine, cystine, methionine, lysine, tryptophan, thyroxin, and mixtures thereof with a reducing sugar selected from the group consisting of glucose, maltose, lactose, glycerinaldehyde, dioxyacetone, 2-desoxy-D-xylose, b-2-desoxy-D-ribose, ribose, xylose, rhamnose, mannose, galactose, xylobiose, fructose, arabinose, talose, allose, altrose, idose, lyxose, glucose amine, glucuronic acid and mixtures thereof to provide a N-glycoside, and thereafter contacting said N-glycoside with a proton donor to provide the stable product.

5. A method of increasing the water-absorbing ability of human skin, comprising the step of applying to the skin a topical base having incorporated therein from 0.5% to 95% by weight of a stable product selected from the group consisting of an Amadori rearrangement product and a Heyne rearrangement product, said product being produced by condensing an amino acid with a reducing sugar to provide a N-glycoside, and thereafter contacting said N-glycoside with a proton donor to provide the stable product.

6. The method of claim 5 in which the amino acid is replaced by an alkali metal salt of said amino acid.

References Cited by the Examiner

UNITED STATES PATENTS 2,715,123  8/1955  Hodges _____ 260—211

FOREIGN PATENTS 200,728  11/1958  Austria.

OTHER REFERENCES

Abrams et al.: J. Am. Chem. Soc., vol. 77, pp. 4795–4796, Sept. 20, 1955.

Drug and Cosmetic Industry, DCI, vol. 53, No. 5, November 1943, p. 553.

Greenstein and Winitz, Chemistry of Amino Acids, John Wiley & Sons Inc., vol. 1, 1961, pp. 672–673.

Kuhn: Deutche Chem. Gesellschaft Berichte, No. 3, 1938, pp. 621–634, Jahrg. 71.

Rattner: Arch of Dermatology-Syphilology, vol. 48, July 1943, pp. 47–49.

Sagarin: Cosmetics, Science and Technology, Interscience, 1957, p. 162.

Weygand: Berichte, vol. 73, No. 11, 1940, pp. 1259–1275.

JULIAN S. LEVITT, *Primary Examiner.*

WILLIAM B. KNIGHT, FRANK CACCIAPAGLIA, JR., LEWIS GOTTS, *Examiners.*

UNITED STATES PATENT OFFICE
CERTIFICATE OF CORRECTION

Patent No. 3,231,472                              January 25, 1966

Otto Karl Jacobi et al.

It is hereby certified that error appears in the above numbered patent requiring correction and that the said Letters Patent should read as corrected below.

Column 1, line 52, for "fate" read -- fat --; column 4, line 68, for "gramos" read -- grams --; column 6, line 38, for "D-zylose, b-2-desoxy-D-ribose," read -- D-xylose, b-2-desoxy-D-ribose, ribose, --; line 39, for "zylobiose" read -- xylobiose --.

Signed and sealed this 27th day of December 1966.

(SEAL)

Attest:

ERNEST W. SWIDER
Attesting Officer

EDWARD J. BRENNER
Commissioner of Patents